(12) United States Patent
Lin

(10) Patent No.: US 7,633,777 B2
(45) Date of Patent: Dec. 15, 2009

(54) ACTIVE PEAK VOLTAGE-LIMITING CLAMP CIRCUIT

(75) Inventor: Kuo-Fan Lin, No. 22, Jianguo E. Rd., Taoyuan City, Taoyuan Hsien (TW)

(73) Assignees: SPI Electronic Co., Ltd., Taoyuan Hsien (TW); Kuo-Fan Lin, Taoyuan Hsien (TW)

( * ) Notice: Subject to any disclaimer, the term of this patent is extended or adjusted under 35 U.S.C. 154(b) by 324 days.

(21) Appl. No.: 11/653,286

(22) Filed: Jan. 16, 2007

(65) Prior Publication Data
US 2008/0170419 A1 Jul. 17, 2008

(51) Int. Cl.
*H02H 7/12* (2006.01)
(52) U.S. Cl. .................. 363/56.11; 363/21.08
(58) Field of Classification Search .......... 363/21.08, 363/56.11, 21.01, 21.04–21.07, 21.09–21.11, 363/20
See application file for complete search history.

(56) References Cited

U.S. PATENT DOCUMENTS 4,441,146 A 4/1984 Vinciarelli 5,896,279 A * 4/1999 Lin ................ 363/21.11

FOREIGN PATENT DOCUMENTS

TW 312869 1/1986

* cited by examiner

*Primary Examiner*—Adolf Berhane
*Assistant Examiner*—Harry Behm
(74) *Attorney, Agent, or Firm*—Muncy, Geissler, Olds & Lowe, PLLC

(57) ABSTRACT

The present invention discloses an active peak voltage-limiting clamp circuit, which comprises a primary switch unit and a secondary switch unit that are used to control the coil current of a transformer, wherein a signal acquisition unit, a zero-point decision unit, a feedback unit and a pulse control unit are used to control the turn-on periods of the primary switch unit and the secondary switch unit; thus, the turn-on period of the primary switch unit is separated from the turn-on period of the secondary switch unit, and a buffer interval for the transient voltage variation is formed therebetween.

9 Claims, 5 Drawing Sheets

ACTIVE PEAK VOLTAGE-LIMITING CLAMP CIRCUIT

FIELD OF THE INVENTION

The present invention relates to an active peak voltage-limiting clamp circuit, wherein the turn-on periods of the active clamp circuit are used to control the excitation current of a transformer to prevent the transformer coil from being saturated.

BACKGROUND OF THE INVENTION

Refer to FIG. 1 a diagram schematically showing a conventional active clamp circuit. In the conventional active clamp circuit, a pulse modulation unit 5 controls a primary switch unit 11 and a secondary switch unit 12 to alternately turn on and thus controls the excitation current of a transformer 2 to modulate the output power. The output power is converted into DC power via a rectification unit, which comprises two switch elements SW3 and SW4. An output feedback unit 4 generates a feedback signal and transmits the feedback signal to the pulse modulation unit 5, which modulates output responsively with respect to the transient variation of the load. Refer to FIG. 2 for the waveforms thereof. When the transient current variation is so great that the current is over the coil-saturation critical line 103, the transformer is saturated, and a surge current 102 appears. The IC chips used by the current pulse modulation unit 5 all have the over-current protection function. However, the over-current protection function only limits the sum of the excitation current and the load current. Thus, when the excitation current is very high, the protection function may be unable to stop the increase of the excitation current and prevent the transformer from saturation because the load current is very low and the sum of the excitation current and the load current does not exceed the limit. The protection function will turn off the primary switch 11 to diminish the surge current as soon as the transformer is saturated and the surge current appears. However, the surge current, which appears momentarily before the primary switch unit 11 is turned off, will generate inductions back and forth between two sides of the transformer and will generate a very high surge voltage 101 on the primary switch unit 11. The surge voltage 101 may seriously damage the power supply, which is a problem the conventional technology has to face. A conventional technology "Optimal Resetting of the Transformer's Core in Single-Ended Forward Converters" disclosed in a U.S. Pat. No. 4,441,146 utilizes two switches to perform simple turn-on operations alternately. However, the conventional technology lacks the mechanism to control the turn-on timing of the two switches. Thus, in the transient state, the transformer is likely to be saturated, which may result in inferior transient-state response, transient-state noise, and over voltage. Consequently, the quality of the output power may be degraded, and the elements of the circuit may be damaged. Another conventional technology "Finite Voltage-Clamp Forward-Conversion Power Supply" disclosed in a R.O.C patent publication No. 312869 utilizes a clamp inductor and diodes to store redundant energy into a capacitor. When the inductance of the clamp inductor is equal to the inductance of the primary-side coil of the transformer, the charge and discharge capabilities of the capacitor are identical, and the saturation of the transformer can be inhibited. However, the abovementioned extra elements raise power consumption and decrease efficiency. Besides, the inductance of the clamp inductor must be identical to the inductance of the primary-side coil of the transformer. If the inductances are different, the mismatch between the clamp inductor and the primary-side coil occurs, and the energy flow will be unbalanced. In fact, those two inductors are hard to match. Therefore, the control method of the active clamp circuit still needs improving to simultaneously have the advantages of simplicity, non-saturation and low power consumption.

SUMMARY OF THE INVENTION

The primary objective of the present invention is to provide an active peak voltage-limiting clamp circuit, wherein the working period of the active clamp circuit is controlled to generate a buffer interval for the transient energy variation to prevent the transformer from being saturated.

The active peak voltage-limiting clamp circuit of the present invention is electrically coupled to a transformer circuit of a power supply. The transformer circuit comprises a transformer for power conversion, a pulse modulation unit driving the transformer and generating pulse modulation signals, and an output feedback unit electrically coupled to the transformer and the pulse modulation unit. The active clamp circuit comprises a primary switch unit, a secondary switch unit, a zero-point decision unit, an auxiliary coil, a peak-to-peak detection unit, a feedback unit and a pulse control unit. The pulse modulation unit controls the operations of the primary switch unit to change the current flowing through the transformer. The auxiliary coil is induced by the primary side of the transformer and generates an acquisition signal. The zero-point decision unit judges the activity of the primary switch unit according to the acquisition signal. Then, the pulse control unit is triggered to turn on the secondary switch unit. According to the acquisition signal, the peak-to-peak detection unit and the feedback unit generates a current, and the current is combined with a shunt current of the primary-side current to form a feedback current. The feedback current controls the turn-off of the secondary switch unit. The time interval between the turn-off of the secondary switch unit and the turn-on of the primary switch unit functions as a buffer interval for the transient voltage variation.

DETAILED DESCRIPTION OF THE PREFERRED EMBODIMENTS

Figure 1:
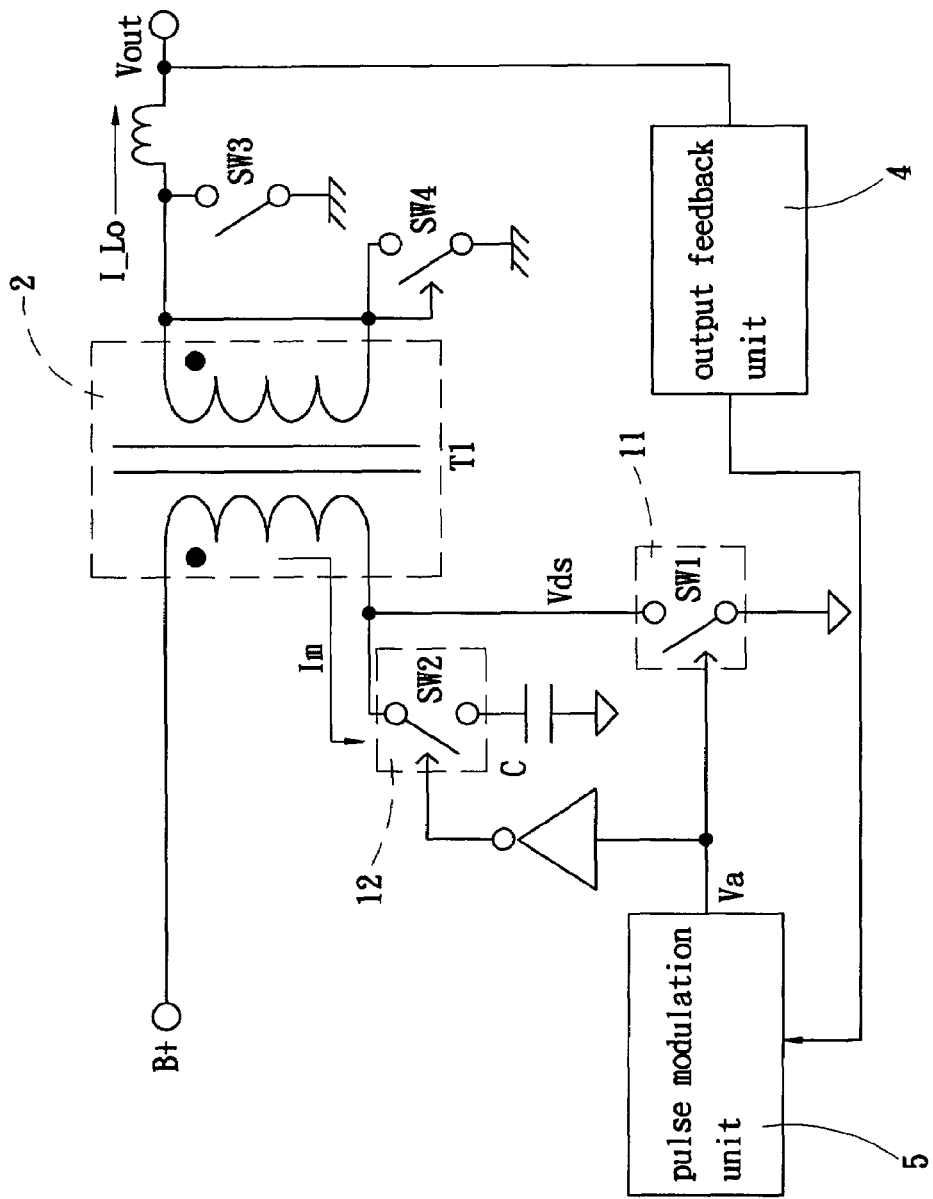
FIG. 1 is a diagram schematically showing a conventional active clamp circuit.
Figure 2:
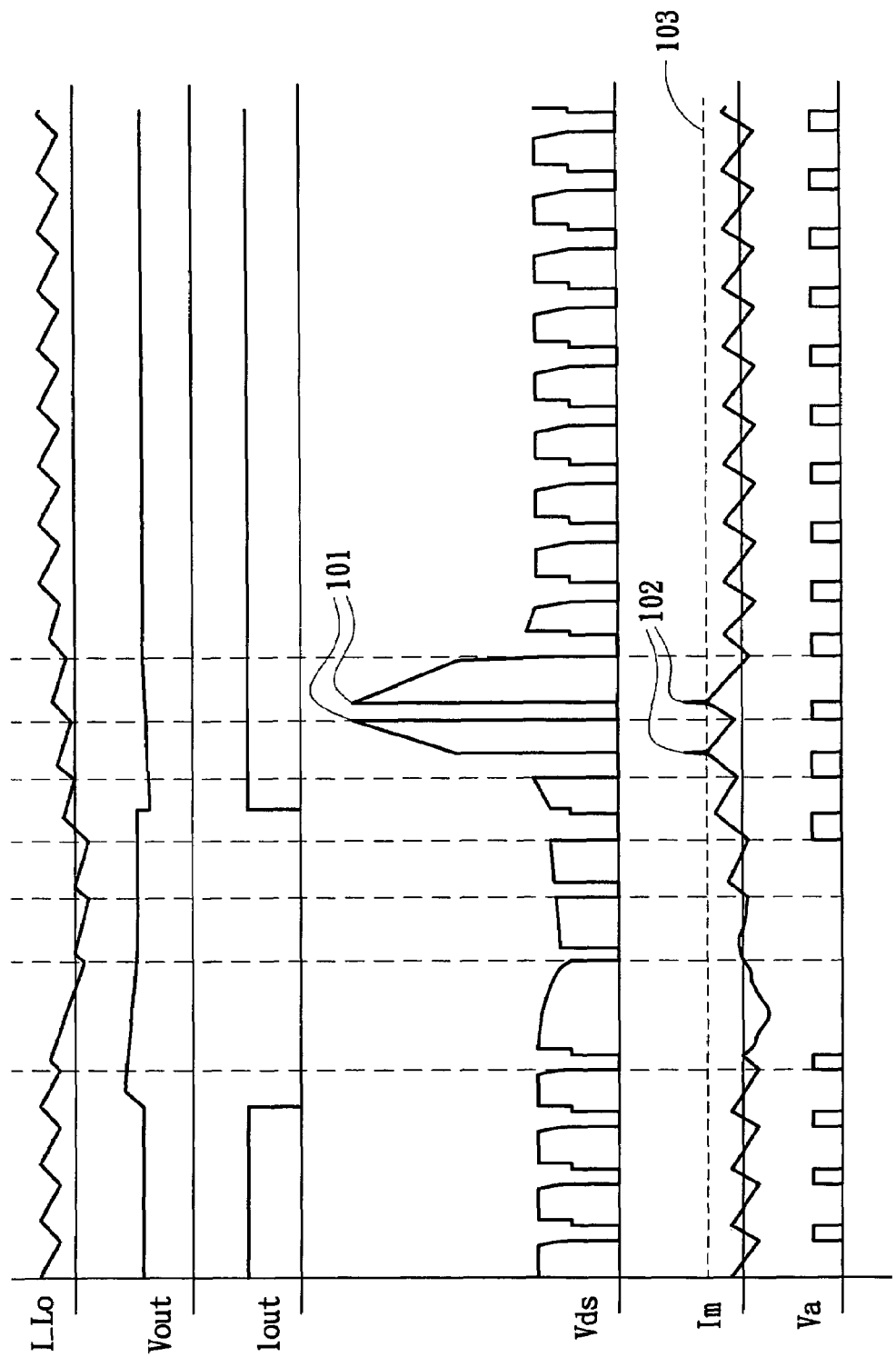
FIG. 2 is a diagram showing the waveforms of a conventional active clamp circuit.

Refer to FIG. 1 for the circuit architecture of the present invention. The active clamp circuit of the present invention comprises a primary switch unit 11 and a secondary switch unit 12, which are controlled by a pulse control unit 9. The on states of the primary switch unit 11 and the secondary switch unit 12 control the excitation current period of the primary side of a transformer 2 of a power supply. The excitation current period has a positive semiperiod and a negative semiperiod, wherein the current increases at the rate of a given slope in the positive semiperiod, and the current decreases at the rate of another given slope in the negative semiperiod. A voltage is induced at the secondary side of the transformer 2 and is converted into a direct-current power output by a rectification unit, which has two switch elements SW3 and SW4. The pulse modulation unit 5 also generates a clock signal CLK for a synchronic rectification driving unit 3. Via the clock signal CLK, the synchronic rectification driving unit 3 can detect the activities of the primary switch unit 11 and the secondary switch unit 12 and then control the two switch elements SW3 and SW4 to operate synchronically. An output-feedback unit 4 acquires a signal from the output end and feedbacks the signal to the pulse modulation unit 5; the pulse modulation unit 5 can thus modulate the working period of the primary switch unit 11 according to the variation of the load. To maintain the excitation current within the unsaturated safe region when the load varies obviously, the present invention utilizes a peak-to-peak detection unit 6, a zero-point decision unit 7, a feedback unit 8, and a pulse control unit 9 to control the turn-on period of the secondary switch unit 12; thus, a transient voltage variation is allowed to exist between the turn-on periods of the primary switch unit 11 and the secondary switch unit 12. From the primary coil of the transformer 2, the peak-to-peak detection unit 6 obtains an acquisition signal, which is a proportional magnification or minification of the voltage of the primary coil. The peak-to-peak detection unit 6 may utilize an auxiliary coil 61 to obtain the acquisition signal and detect the maximum and minimum values of the acquisition signal. Then, the zero-point decision unit 7 decides a plurality of critical points of the periodically-varying acquisition signal according to the maximum and minimum values of the acquisition signal. Via the plurality of critical points, the activities of the primary switch unit 11 are learned. According to the data of the activities of the primary switch unit 11, the turn-on timing of the secondary switch unit 12 can thus be separated from the turn-on timing of the primary switch unit 11. The pulse control unit 9 is triggered by the clock signal CLK of the pulse modulation unit 5 to advance the turn-off of the secondary switch unit 12; thereby, the primary switch unit 11 will not be turned on unless the secondary switch unit 12 is turned off. The feedback unit 8 generates a first feedback current Ib in proportion to the acquisition signal and transmits the first feedback current Ib to the pulse control unit 9. The pulse control unit 9 controls the activities of the secondary switch unit 12. When the secondary switch unit 12 is turned on, it acquires a second feedback current Is from the transformer coil via another loop. The first feedback current Ib and the second feedback current Is are combined into a third feedback current, and the third feedback current triggers the pulse control unit 9 to turn off the secondary switch unit 12, wherein the turn-off timing of the secondary switch unit 12 is determined by the value of the third feedback current. Thus, a buffer interval is preserved to tolerate the variation of the voltage between the turn-off of the secondary switch unit 12 and the turn-on of the primary switch unit 11. Consequently, the turn-on period of the primary switch unit 11 can be prolonged to raise power output when the load increases. Further, the system can safely work within the buffer interval without the transformer saturation induced by current variation.

Figure 3:
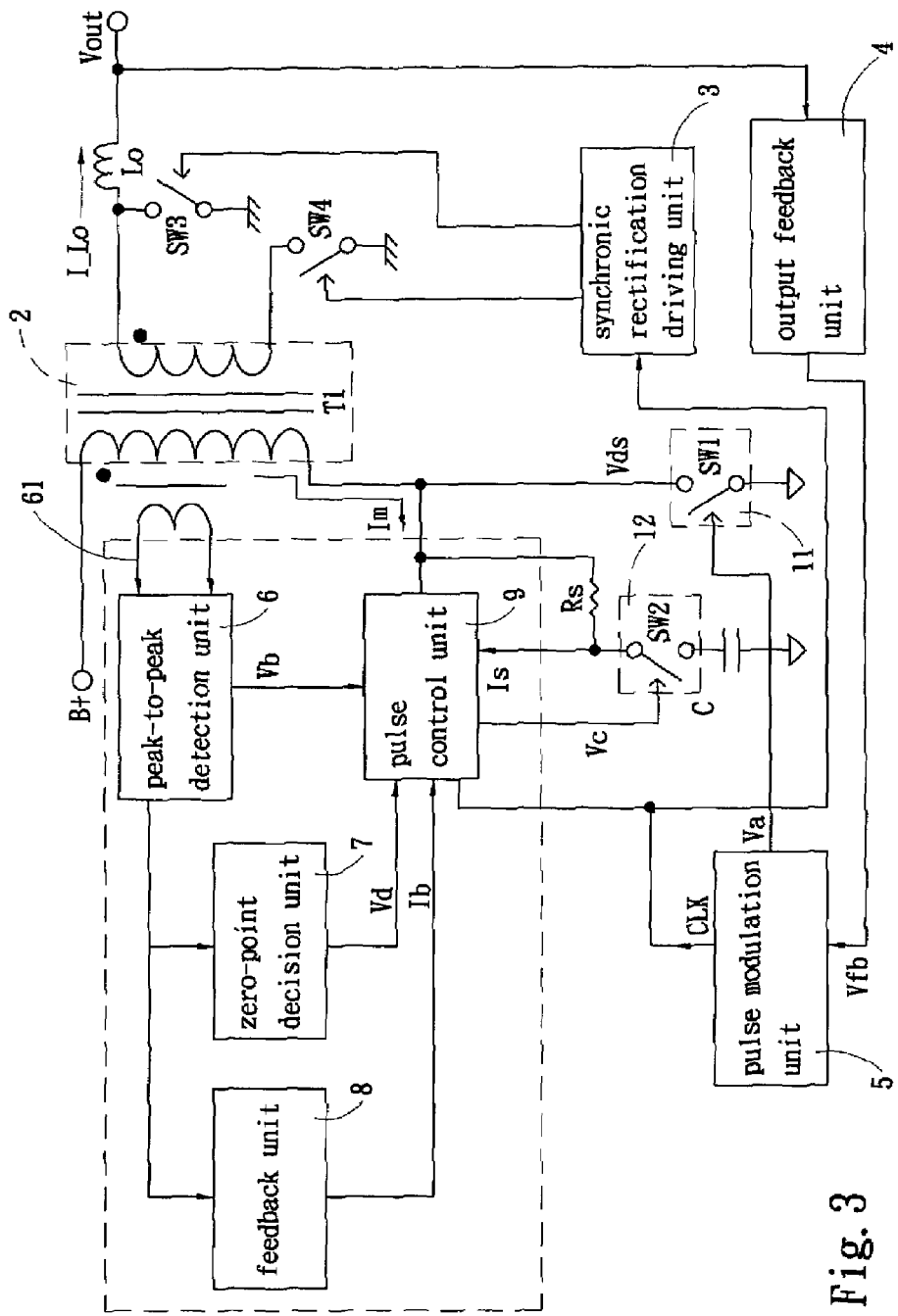
FIG. 3 is a block diagram schematically showing the architecture of the circuit according to the present invention.
Figure 4:
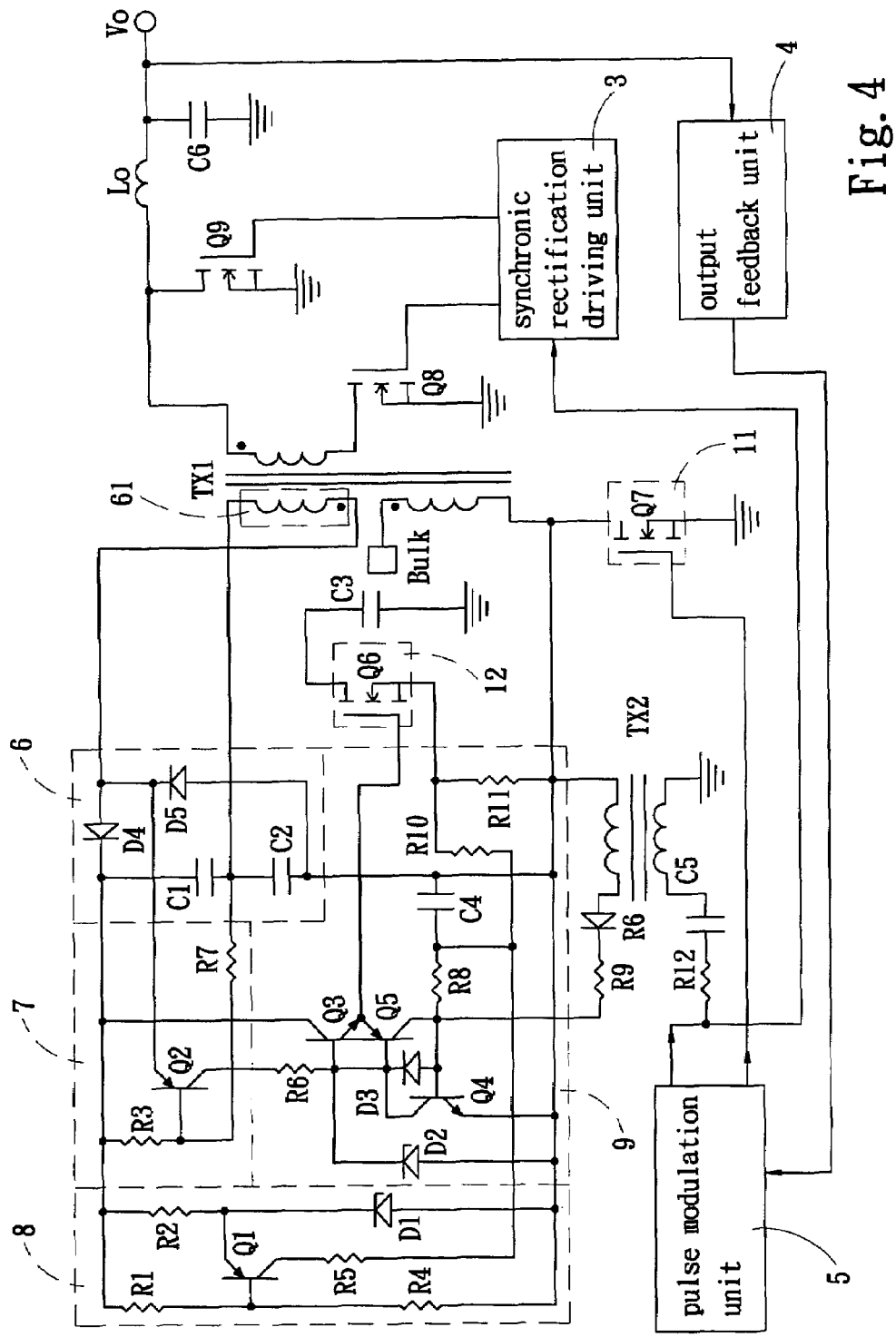
FIG. 4 is a diagram schematically showing the circuit according to an embodiment of the present invention.
Figure 5:
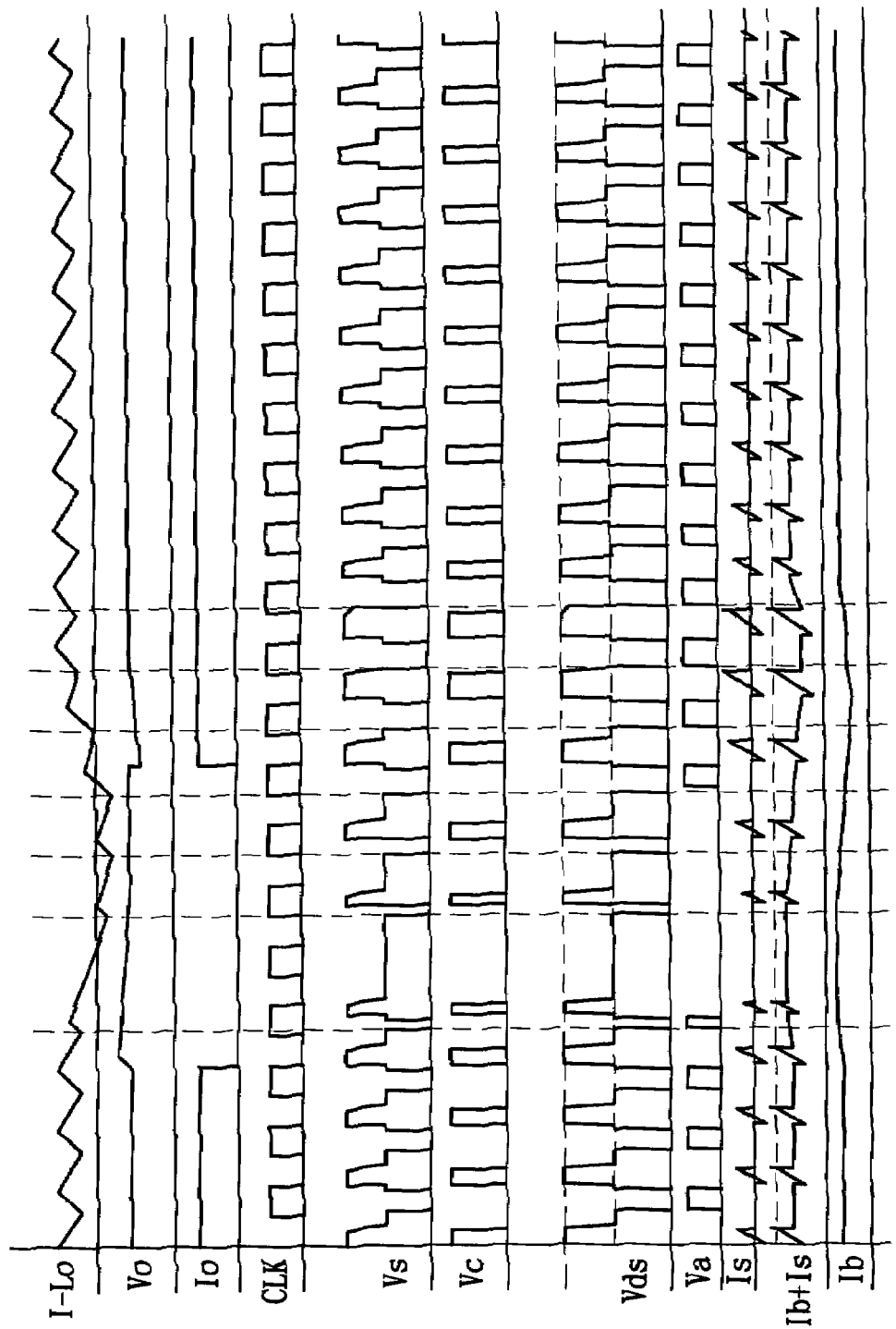
FIG. 5 is a diagram schematically showing the waveforms of the circuit according to an embodiment of the present invention.

Refer to FIGS. 3 to 5 for the physical circuit realizing the architecture of the present invention and the waveforms of the related operations. The peak-to-peak detection unit 6 has capacitors C1 and C2 and diodes D4 and D5. The peak-to-peak detection unit 6 utilizes the auxiliary coil 61, which is installed beside the transformer 2, to senses the acquisition signal, which is a proportional magnification or minification of the voltage of the primary coil. Then, the peak-to-peak detection unit 6 obtains the maximum and minimum values of the acquisition signal. The zero-point decision unit 7 has a transistor Q2 and resistors R3 and R7. Two ends of the auxiliary coil 61 are respectively coupled to the base and emitter of the transistor Q2. When the acquisition signal varies periodically, the working state of the transistor Q2 also varies correspondingly, and the activities of the primary switch unit 11 can be obtained from the variation of the working states of the transistor Q2. The pulse control unit 9 has a capacitor C4, a diode D3, a Zener diode D2, three transistors Q3, Q4 and Q5, and four resistors R6, R8, R10 and R11. The transistors Q3, Q4 and Q5 form a latch to keep the turn-on state or the turn-off state of the secondary switch unit 12. The pulse control unit 9 is triggered by the positive edge of the clock signal CLK to turn off the secondary switch unit 12. After the turn-off state of the primary switch unit 11 is confirmed, the zero-point decision unit 7 makes the transistors Q3, Q4 and Q5 push the secondary switch unit 12 to turn on. The feedback unit 8 has a Zener diode D1, a transistor Q1, and four resistors R1, R2, R4 and R5. The acquisition signal is transmitted to the base and emitter of the transistor Q1, and the emitter is coupled to the Zener diode D1 to stabilize the voltage. Thus, the emitter has a fixed voltage, and the collector of the transistor Q1 creates the first feedback current Ib, which is inversely proportional to the acquisition signal. When the secondary switch unit 12 is turned on, the second feedback current Is is obtained from the coil current of the transformer 2 via a loop. The first feedback current Ib and the second feedback current Is are combined into a third feedback current. The third feedback current triggers the transistor Q4 of the pulse control unit 9 and makes the working states of the transistors Q3, Q4 and Q5 change, and the secondary switch unit 12 is thus turned off. Refer to FIG. 5 for the waveforms shown therein. The pulse modulation unit 5 uses a voltage Va to trigger the turn-on of the primary switch unit 11. Thus, the waveform of Va denotes the turn-on periods of the primary switch unit 11. Similarly, the waveform of Vc denotes the turn-on periods of the secondary switch unit 12. The waveform of Vds denotes the voltage between two ends of the primary switch unit 11 when the primary switch unit 11 is turned off. It can be learned from those waveforms that all the turn-on periods of the primary switch unit 11 are separated from all the turn-on periods of the secondary switch unit 12. Further, there is a buffer interval preserved between the turn-on periods of the primary switch unit 11 and the secondary switch unit 12. When no load exists, the turn-on periods of the primary switch unit 11 and the secondary switch unit 12 become shorter, and the buffer interval expands. When the load increases, the buffer interval allows the primary switch unit 11 and the secondary switch unit 12 to expand their turn-on periods and prevents the transformer 2 from saturation when the primary switch unit 11 has the maximum turn-on period.

In summary, the present invention controls the time interval between the turn-off of the secondary switch unit 12 and the turn-on of the primary switch unit 11 to obtain a buffer interval to sustain voltage variation; when the load varies, the turn-on period of the primary switch unit 11 can extend into the buffer interval to increase output; further, the buffer interval can prevent the transformer from saturation when the current varies. Thus, the present invention indeed possesses novelty and non-obviousness and meets the requirement of a patent. Therefore, the Inventor files the application for a patent. It will be greatly appreciated that the patent is fast approved.

Those described above are the preferred embodiments to exemplify the present invention. However, it is not intended to limit the scope of the present invention. Any equivalent modification or variation made by the persons skilled in the art according to the spirit of the present invention is to be also included within the scope of the present invention. For example, the signal acquisition unit may also adopt a semiconductor element to obtain a signal, which is a proportional magnification or minification of the coil current. The scope of the present invention depends on the claims stated below.

What is claimed is:

1. An active peak voltage-limiting clamp circuit, electrically coupled to a power supply's transformer circuit which comprises a transformer for power conversion, a pulse modulation unit driving said transformer and generating a clock signal, and an output feedback unit electrically coupled to said transformer and said pulse modulation unit, wherein said active peak voltage-limiting clamp circuit is used to control the current of said transformer and comprises:

a signal acquisition unit electrically coupled to the primary side of said transformer to acquire and output an acquisition signal, said signal acquisition unit utilizing an auxiliary coil, which is installed beside said transformer, to obtain said acquisition signal, which is a proportional magnification or minification of the current of said transformer, said signal acquisition unit including a peak-to-peak detection unit to decide the maximum and the minimum of said acquisition signal;

a zero-point decision unit electrically coupled to said signal acquisition unit and receiving said acquisition signal and deciding a plurality of critical points of the periodical variation of said acquisition signal according to the maximum and minimum values of said acquisition signal;

a feedback unit electrically coupled to said signal acquisition unit and receiving said acquisition signal and generating a first feedback current according to said acquisition signal, wherein a second feedback current is obtained via shunting the current of the primary side of said transformer, and said first feedback current and said second feedback current are combined into a third feedback current;

a primary switch unit and a secondary switch unit electrically coupled to said transformer and controlling the current path of said transformer, wherein said pulse modulation unit determines the turn-on timing of said primary switch unit; and a pulse control unit triggered by said third feedback signal, said clock signal and said critical points defined by said zero-point decision unit to control the turn-on and turn-off of said secondary switch unit and separate the operation of said secondary switch unit from that of said primary switch unit to form the excitation current periods of said transformer.

2. The active peak voltage-limiting clamp circuit according to claim 1, wherein said signal acquisition unit utilizes a semiconductor element to proportionally magnify or minify the coil voltage and obtain said acquisition signal.

3. The active peak voltage-limiting clamp circuit according to claim 1, wherein the excitation current period of said transformer has a positive semiperiod and a negative semiperiod, and the current increases at the rate of a given slope in said positive semiperiod, and the current decreases at the rate of another given slope in said negative semiperiod.

4. The active peak voltage-limiting clamp circuit according to claim 1, wherein said zero-point decision unit is coupled to two ends of said auxiliary coil via a semiconductor element; when the current varies, said acquisition signal can thus turn on or turn off said semiconductor element to detect a plurality of critical points of the periodical variation of the excitation current of said transformer.

5. The active peak voltage-limiting clamp circuit according to claim 1, wherein said pulse control unit has a minimum voltage limit; when the output voltage is lower than said minimum voltage limit because the no-load state makes the negative semiperiod of the excitation current period over extend, said negative semiperiod stops extending.

6. The active peak voltage-limiting clamp circuit according to claim 1, wherein said pulse control unit utilizes a Zener diode to generate a minimum voltage limit.

7. The active peak voltage-limiting clamp circuit according to claim 1, wherein said clock signal generated by said pulse modulation unit is a maximum period limit for the turn-on period of said secondary switch unit.

8. The active peak voltage-limiting clamp circuit according to claim 7, wherein said secondary switch unit is turned off by the positive edge of said clock signal generated by said pulse modulation unit.

9. The active peak voltage-limiting clamp circuit according to claim 1, wherein said feedback unit utilizes a voltage-controlled current source to generate a current inversely proportional to said acquisition signal.

* * * * *